(12) United States Patent
Erdmann

(10) Patent No.: US 7,383,700 B2
(45) Date of Patent: Jun. 10, 2008

(54) SYSTEM FOR HEAT TREATMENT OF GLASS

(76) Inventor: Wolfgang Erdmann, Waldstrasse 10, Ratingen, , 40885 (DE)

( * ) Notice: Subject to any disclaimer, the term of this patent is extended or adjusted under 35 U.S.C. 154(b) by 342 days.

(21) Appl. No.: 10/880,345

(22) Filed: Jun. 30, 2004

(65) Prior Publication Data

US 2005/0022558 A1 Feb. 3, 2005

(30) Foreign Application Priority Data

Jul. 3, 2003 (DE) ............... 103 30 196

(51) Int. Cl.
*C03B 23/02* (2006.01)
*C03B 29/04* (2006.01)

(52) U.S. Cl. ............... 65/273; 65/104; 65/118; 65/348

(58) Field of Classification Search ......... 65/273, 65/348, 349, 111, 119, 104, 351
See application file for complete search history.

(56) References Cited

U.S. PATENT DOCUMENTS

| 3,665,730 A * | 5/1972 | Linzer ............... 65/182.2 |
| 4,059,426 A * | 11/1977 | Starr ............... 65/25.2 |
| 4,138,237 A * | 2/1979 | Eggert et al. ............... 65/104 |
| 4,505,671 A | 3/1985 | McMaster |
| 4,617,043 A | 10/1986 | Reunamäki |
| 4,738,705 A * | 4/1988 | McMaster ............... 65/119 |
| 4,886,540 A * | 12/1989 | Nitschke ............... 65/351 |
| 5,110,338 A | 5/1992 | McMaster |
| 5,368,624 A | 11/1994 | Lehto et al. |
| 5,620,492 A * | 4/1997 | Land ............... 65/348 |
| 5,647,882 A * | 7/1997 | Thiessen ............... 65/348 |
| 5,700,306 A * | 12/1997 | Maltby et al. ............. 65/182.2 |
| 6,050,814 A * | 4/2000 | Lewandowski ............. 432/159 |
| 6,131,411 A * | 10/2000 | Schnabel, Jr. ............... 65/111 |
| 6,363,752 B1 * | 4/2002 | Becker ............... 65/273 |
| 6,470,711 B1 * | 10/2002 | Jarvinen et al. ............. 65/273 |
| 6,783,358 B1 * | 8/2004 | Lewandowski et al. ..... 432/144 |
| 6,901,773 B2 * | 6/2005 | Thomas et al. ............. 65/118 |
| 7,000,433 B1 * | 2/2006 | Lisec ............... 65/356 |
| 2004/0093904 A1 * | 5/2004 | Haws et al. ............. 65/349 |

FOREIGN PATENT DOCUMENTS

| EP | 0937687 A2 | 8/1999 |
| WO | 01 32570 A1 | 5/2001 |

* cited by examiner

*Primary Examiner*—Steven P. Griffin
*Assistant Examiner*—DeMaris R. Wilson
(74) *Attorney, Agent, or Firm*—David S. Safran

(57) ABSTRACT

A system and a process for heat treatment of glass or other materials where fan air is blown into a heating chamber via propellant air fans and the chamber air is circulated. In order to achieve effective convection, the propellant air fans have cylindrical mixing sections. Additionally, resulting air swirls flow around the heating means which are located in the heating chamber.

26 Claims, 4 Drawing Sheets

SYSTEM FOR HEAT TREATMENT OF GLASS

BACKGROUND OF THE INVENTION

1. Field of the Invention

The present invention relates generally to a systems and processes for heat treatment of glass and more specifically to heat treatment of glass in a tempering system.

2. Description of Related Art

In the heat treatment of glass, especially in a tempering system or tempering furnace, there are conventionally radiant heaters to heat the glass. The heat is injected at least in large part via heat radiation.

In particular, in so-called low-E glass (i.e., glass with low emission, conventionally by a reflective coating) a problem exists where heat injection, which is much less compared to normal glass, is possible by heat radiation. Alternatively or in addition, therefore there is heat transfer by convection (a warm or hot air flow being directed at the glass or routed past it) to improve heat exchange.

A similar problem, especially relevant again with low-E glass, resides in "key formation" as the flat glass enters such a system. The still cold incoming glass rolls on ceramic rollers of a conveyor means, where the rollers are of the temperature of the heating chamber (a temperature of roughly 700° C.). The heat transfer from the rollers to the bottom of the glass is very intensive, but the heat conduction of the glass, as a result of its low temperature, is still low. The heat radiation from the top is less effective, especially for low-E glass, so that the glass plate in the heating chamber has the tendency to arch in the manner of a key. This is especially pronounced in low-E glass in which the reflective coating is not on the top side that comes into contact with the rollers, in order to avoid damage to the coating.

U.S. Pat. No. 4,059,426, which comprises the starting point of this invention, discloses a system for heat treatment of glass. According to one version, compressed air is blown into the heating chamber by means of a propellant air fan, also called an air flow amplifier, which is located vertically above the glass. The compressed air is fed tangentially into the propellant air fan which, based on the Coanda effect, conveys the warm air located in the heating chamber through a diffuser which widens conically.

The entire volumetric flow which flows through the propellant air fan is greater by a volumetric factor of 10 to 20 than the volumetric flow of supplied fan air. In order to achieve the required high circulation of air in the heating chamber, a comparatively large volumetric flow of fan air must be supplied at the indicated volumetric factor. In order to prevent excess cooling of the air in the heating chamber by the supplied fan air, the fan air is preheated.

Published European Patent Application EP 0 058 529 A1 discloses a similar system for heat treatment of glass. In contrast to the aforementioned propellant air fans, open nozzles are arranged in rows transverse to the conveyor direction of the glass, in order to direct fan air from top and bottom onto the glass surface. The glass is conveyed in the heating chamber on rollers.

The systems for heat treatment, described in published International Patent Application WO 95/04708 A1 and in U.S. Pat. No. 5,368,624, likewise have propellant air fans for controlled delivery of air. These propellant air fans are in any case intended solely for cooling of the glass which is to be treated.

Another known heat treatment system, as described in published International Patent Application WO 00/37371 A1, shows a heating means for radiant heating underneath the glass which is to be treated and several hot air nozzles above the glass which is to be treated for heat transfer by convection. Here, the hot air nozzles are used solely to deliver fan air. The disadvantage in this concept is the danger of spot heating of the glass to be treated.

SUMMARY OF THE INVENTION

A primary object of this invention is to devise a system and a process for heat treatment of glass or other materials, the required volumetric flow of fan air being reduced, especially such that fan air, which has not been preheated, can be supplied without excess cooling of the air in the heating chamber and/or convection is improved. Here and below, the invention is explained only for the preferred material, glass, especially plate glass. However, this is not intended to limit the scope of protection. Rather it should always be considered at the same time that other, preferably plate-shaped materials which preferably are to be treated with high temperatures are intended, especially aluminum sheet.

Another aspect of this invention resides in that each of the propellant air fans has a mixing section with a constant clear diameter or cross section. As a result, efficient convection is provided with distinctly less fan air being required than in the prior art. In particular, it is possible to directly feed the fan air without preheating.

With respect to the designations "air" or "fan air" and "chamber air", it is pointed out that, with respect to the present invention, the term "air" is generally defined as any gas or gas mixture. In particular, the system can also work with protective gas and there can be a protective gas atmosphere in the heating chamber.

In fact, in the course of operation, fan air which has not been preheated can be supplied to the propellant air fans. As a result, the system does not have preheating for the fan air and, in fact, need not have it. It has been recognized that the mass flow of fan air which has not been preheated, due to the higher density of the fan air, is higher and thus improved acceleration of the chamber air in the mixing section of the propellant air fan takes place. Against all expectations, the efficiency for convection with the system of the present invention is therefore higher, not lower.

The boundary conditions for the system of the present invention in the detection of the system parameters, especially the operating parameters, are stipulated with the ambient temperature in the system. The working temperatures of, for example, 700° C. in the heating chamber are too extreme for the corresponding measurements. Based on the measured values for the ambient temperature in the system, the conditions continue to improve at the operating temperature of the system since even the temperature difference between the fan air and the chamber air becomes so great that, for example, a tripling of the volumetric flow or the volumetric factor occurs. This leads, for example, to a tripling of the velocity of the air flow which arises at the exit of the mixing section of the propellant air fan.

Another aspect of this invention which can also be implemented independently is that the air swirls produced by the propellant air fan flow around or brush at least one heating means at a time in the heating chamber. This is in turn conducive to efficient convection so that in particular a reduction of the operating costs is enabled.

Other advantages, features, properties and aspects of this invention result from the following description of preferred embodiments using the drawings.

DETAILED DESCRIPTION OF THE INVENTION

In the figures, for the same or similar parts, the same reference numbers are used, the corresponding or comparable advantages and properties being achieved even if a repeated description is omitted for reasons of simplification.

The present invention is directed primarily to the heat treatment of glass. Technically similar problems can also be observed in other materials which are to be treated at high temperatures, so that in principle the teaching of this invention can also relate to systems and processes for heat treatment of other materials which are to be treated with high temperatures, for example, aluminum sheet. Otherwise, it applies that the glass which is to be heat-treated within the scope of the teaching of the invention is normally flat glass, therefore plate glass.

Figure 1:
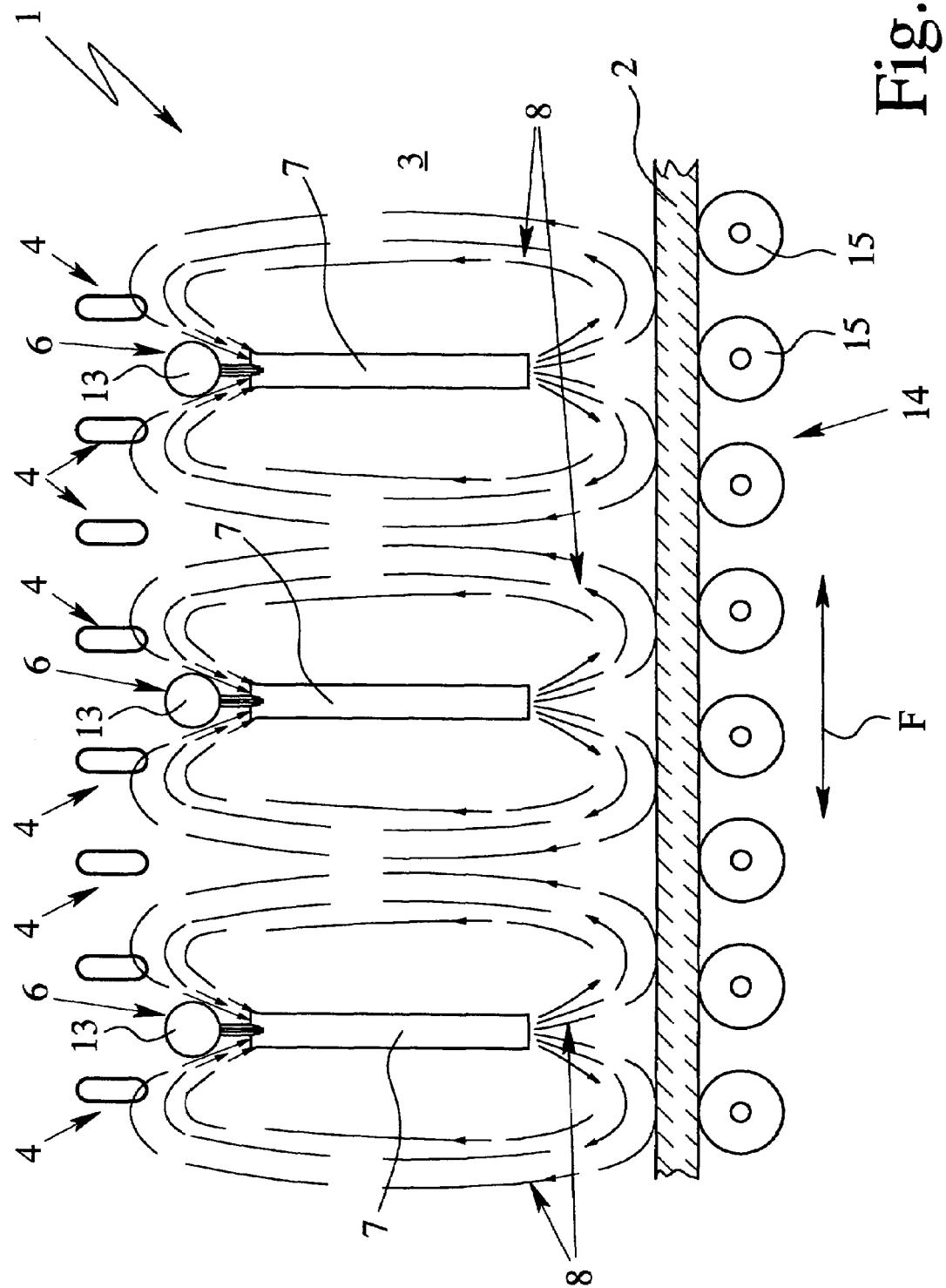
FIG. 1 shows a schematic lengthwise section of a system provided in exemplary embodiments of the present invention for heat treatment of glass.
Figure 2:
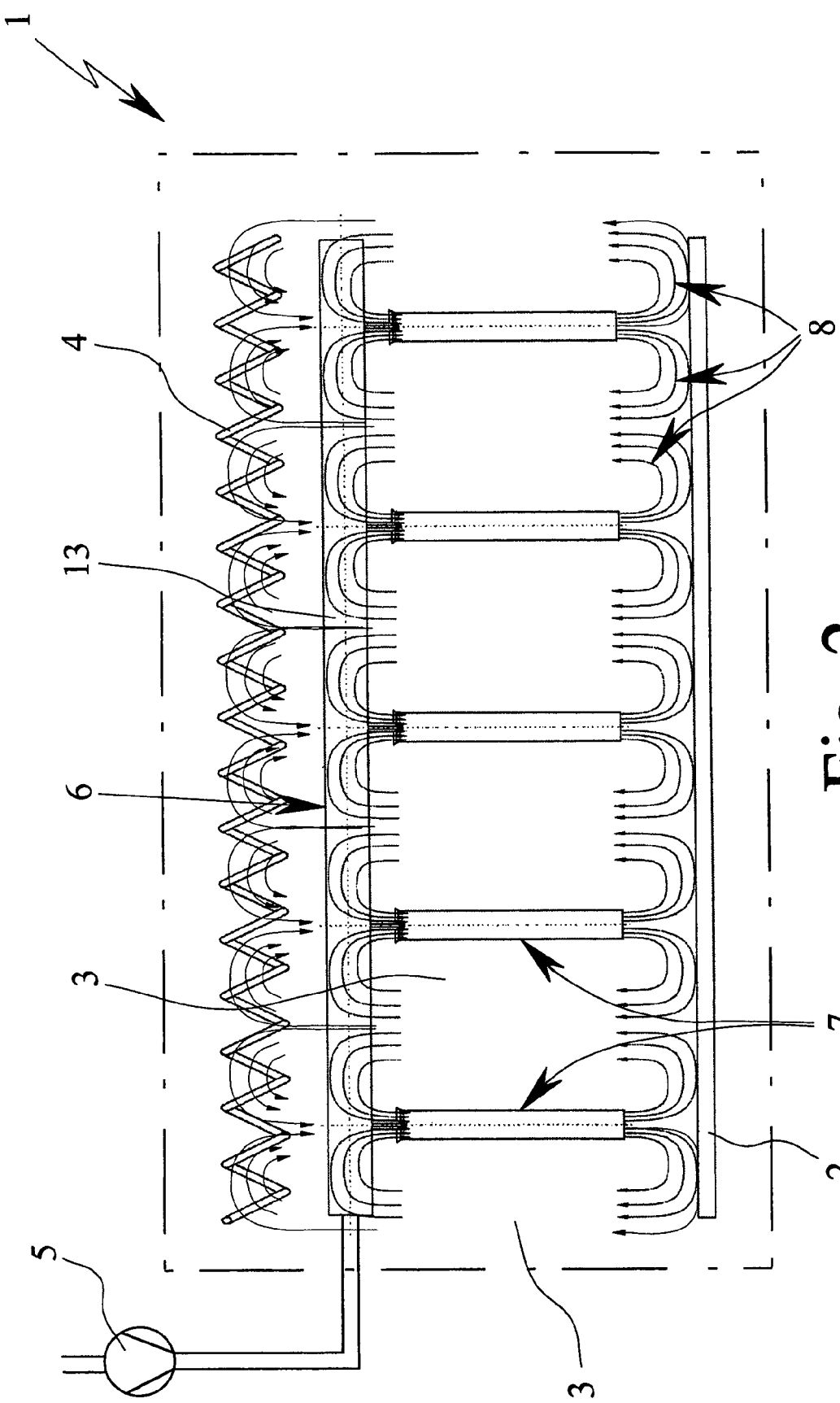
FIG. 2 is a schematic partial cross section of the system shown in FIG. 1.

FIG. 1 shows a schematic lengthwise section of a system 1 of the present invention for heat treatment of glass 2, in extract form. FIG. 2 shows the system 1 in a partial cross section, transversely to the section as shown in FIG. 1. In FIG. 2, the housing of the system 1 is shown by the dot-dash line, as it is omitted in FIG. 1 for reasons of simplification.

The system 1 has a heating chamber 3, several heating means 4, a fan 5 (shown only in FIG. 2) and a guiding means 6 connected to it for supplying fan air to the heating chamber 3. In this context the expression "fan" is preferably to be understood in the sense of a compressor.

The guiding means 6, for its part, has several propellant air fans 7 to which, on their inlet side, fan air or compressed gas can be supplied from the fan (compressor) 5, as seen in FIG. 2. The propellant air fans 7 are used to produce air swirls 8 in the heating chamber 3, as shown in FIGS. 1 & 2. The air swirls 8 are directed at or brush against the glass 2, in order to heat the glass 2 by convection or at least to cause good heat exchange between the air and the glass 2. Of course, it basically applies that a large portion, often the largest portion, of the amount of heat is transferred to the glass 2 by the existing radiant heating.

The concept of air swirls is not intended otherwise to indicate a turbulent flow, but rather to encompass a predominantly laminar flow which, however, is induced in a circulatory manner and thus on the glass 2 it has a comparatively high flow velocity, for example, a flow velocity of roughly 10 ms. Here, it must be considered that the operating temperature in this heating chamber 3 is around 700° C.

Figure 3:
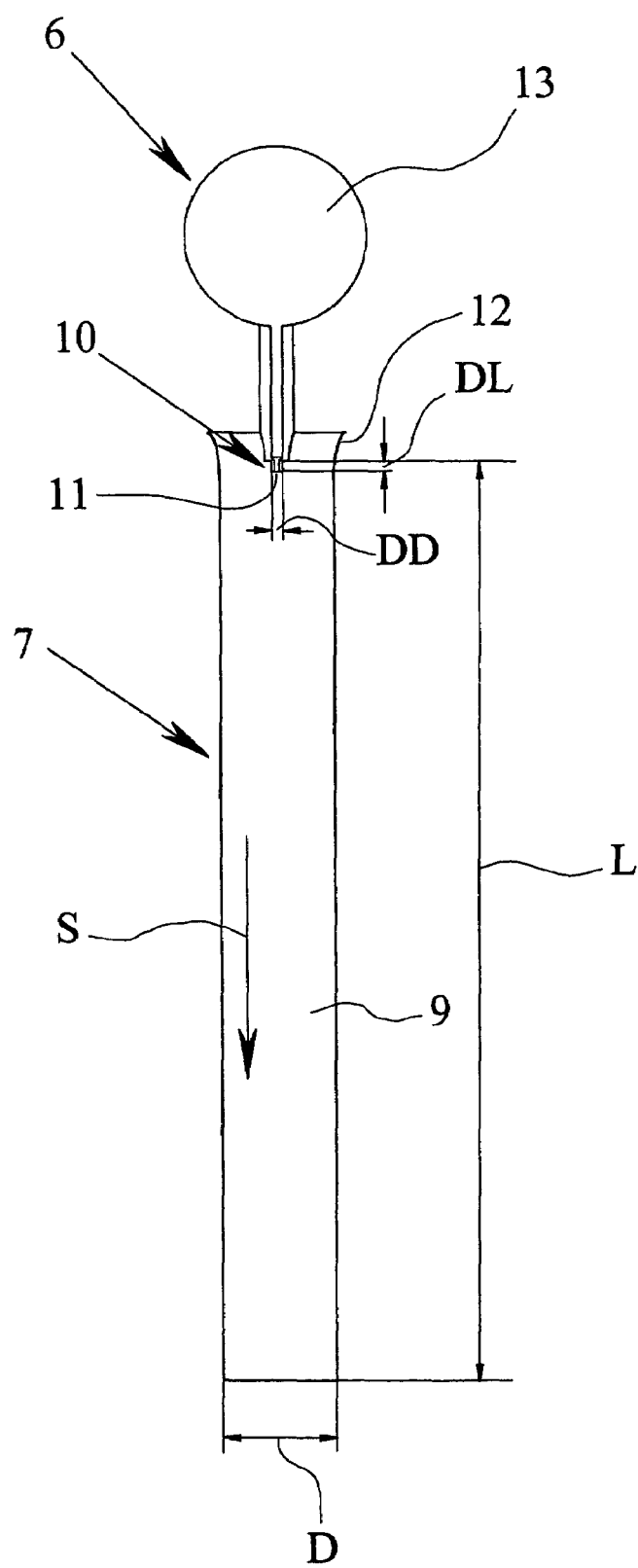
FIG. 3 is a schematic lengthwise section of a propellant air fan of the system in a first embodiment.

FIG. 3 shows, in a schematic cross section, a propellant air fan 7 in which a preferred structure of the propellant air fan 7 is explained below. The propellant air fan 7 is also known in the art as an air flow amplifier.

The propellant air fan 7 has a mixing section 9 for the convey of chamber air by in-flowing fan air and for mixing of chamber air and fan air. The mixing section 9 is formed or bordered by a correspondingly shaped, preferably tubular, especially cylindrical component.

As indicated in FIG. 3, the mixing section 9 has a constant clear diameter D or cross section. Tests have shown that, for a comparatively small fan air flow, a large volumetric flow of the air flowing overall through the propellant air fan 7 can be achieved in this way. It is pointed out that the specification of the constant clear diameter D or cross section should be understood against the background of possible production tolerances or imperceptible deviations. In this sense, it should be required in any case that the mixing section 9 have an at least substantially constant clear diameter D or cross section.

Preferably, the propellant air fan 7 or at least its mixing section 9 has a ratio of length L to clear diameter D of at least 4 (preferably at least 5, as well as 8 or more) and at most 20 (preferably less than 15 and especially less than 10). The length of the mixing section 9 relative to the diameter is determined by contradictory requirements.

If the mixing section is too short, the velocity distribution in the air flow emerging from the mixing section 9 is not homogeneous. However, if the mixing section 9 is too long, in any case, relative to the diameter, the flow friction on the wall of the mixing section 9 is too great and the efficiency of the mixing section 9 decreases. The indicated ratios discussed above and provided below relate to the optimization determined by tests.

The length L of the propellant air fan 7 or its mixing section 9 is preferably at least 15 cm (preferably at least 18 cm and especially 20 cm or more). The diameter D is preferably at least 10 mm (preferably at least 20 mm and especially 25 mm or more).

The fan air can be supplied preferably centrically (e.g., centrally) to the propellant air fan 7 or the mixing section 9 and especially coaxially to the lengthwise extension of the mixing section 9. To do this, a nozzle 10, which is preferably centrically (e.g., centrally) arranged is assigned on the input side to the propellant air fan 7 or the mixing section 9.

The nozzle 10 has an opening 11 with a length DL from 1 to 12 mm, (preferably 3 to 5 mm). The opening 11 has preferably a diameter DD of at most 2 mm (especially 1 mm). A ratio DL/DD of at least 3 to at most 5 is optimum. Here it must be considered that the velocity of the fan air in the opening 11 of the nozzle 10 is near the speed of sound. Therefore, this section should be a short as possible, but should also afford the necessary acceleration.

The opening 11 is dimensioned such that a comparatively small fan flow is supplied to the assigned propellant air fan 7 and the assigned mixing section 9. But the opening 11 in the diameter DD is chosen such that scaling of the nozzle opening 11 is avoided. Scaling, in this regard, is defined not only as direct scale formation on the nozzle opening, but also clogging of the nozzle opening 11 by scale which occurs in some other way. Accordingly, low-scale materials are used in the production of the nozzle 10. In any case, materials can be used which lead to fine-grain scale which reduces as much as possible any closing of the nozzle opening 11.

The propellant air fan 7 in the example has a confuser 12, i.e., a structure for consolidating the flow and the opposite of a diffuser. A normal propellant air fan known from the prior art has a confuser, a short mixing section and a diffuser. For the system of the present invention, the presence of a confuser 12 has proven effective for the propellant air fan 7. Efficiency is optimized in this way. In any case, the confuser 12 need not be very long. However, it is important that the exit opening of the nozzle 10, measured at the ambient temperature in the system 1, is roughly at the height of the transition from the mixing section 9 to the confuser 12. In view of the given temperature differences, the location cannot be quite exactly determined beforehand. The arrangement of the nozzle 10 in this area is, however, of considerable importance for efficiency, as tests have shown.

Basically, the operation of the system of the present invention is possible even without confusers on the propellant air fans 7, but then the efficiency is reduced.

The confuser 12 preferably has a ratio of the inlet diameter to the outlet diameter of at most 1.5 or less, and/or a length that is a maximum of 5% (preferably a maximum of 4% and especially 3% or less) of the length L of the downstream mixing section, 9. Preferably, the confuser 12 is made in one piece with the mixing section 9 or the tubular component which forms the mixing section 9.

The nozzle 10 preferably projects into the mixing section 9 or at least into the confuser 12 in order to achieve a flow which is as uniform as possible, preferably with little turbulence, to maximize the air flow which is flowing overall through the propellant air fan 7.

The propellant air fan 7 preferably does not have a diffuser. This is a major difference from the propellant air fans known in the prior art which have considered a diffuser as critically necessary.

The nozzle 10 is preferably supplied with fan air with a pressure of roughly 100 kPa. The fan air flow per propellant air fan 7 is preferably at most 2 $m^3/h$ (more preferably less than 1.5 $m^3/h$, and especially 1.0 $m^3/h$ or less). Preferably, a fan air flow of roughly 0.5 to 1.0 $m^3/h$ (especially 0.7 $m^3/h$) is supplied to each propellant air fan 7 and each mixing section 9.

Depending on the diameter D of the mixing section 9, a total flow of air through the mixing section 9 of at least 20 $m^3/h$ (preferably at least 30 $m^3/h$, especially at least 35 $m^3/h$) can be achieved. The flow velocity is preferably less than 25 m/s (especially less than 20 m/s) for the air flow emerging from the propellant air fan 7. Typically, under the boundary conditions of the measurements, at the ambient temperature in the system 1, an air flow with a flow velocity of typically 10 m/s at the outlet of the mixing section 9 can be established. For the explained reasons, however, this changes the operating temperature of the system 1.

The propellant air fan 7 preferably has a volumetric factor—meaning the ratio of the entire volumetric flow of the air flowing out of the propellant air fan 7 to the supplied fan air flow—of at least 30 (preferably at least 40 and especially 50 or more).

Preferably, the propellant air fans 7 are located at a distance of from 5 cm to 15 cm (preferably essentially 8 cm to 10 cm) from the glass 2. In particular, the propellant air fans 7 are located above the glass 2 and/or at least run essentially vertically.

For the normal arrangement of the propellant air fan, in view of the oscillating motion of the glass on the conveyor means, it applies that normally an essentially vertical running arrangement is advantageous. However, in areas an arrangement which runs at a slant can also be advantageous, for example, an arrangement at an angle of roughly 30° C. in the area of the inlet openings, doors, etc.

In the preferred configuration, a large volumetric flow is produced which, proceeding from the propellant air fan 7, strikes the glass surface and in the form of air swirls 8 is returned again to the inlet side of the propellant air fan 7. This leads to efficient heat coupling and convection between the glass 2 and the air flow striking the glass 2. As provided in the present invention, by using fan air which has not been preheated the flow, velocity of the volumetric flow is increased. This is more efficient than a further increase of the volumetric flow in this velocity range, with respect to heat coupling of the transfer of the amount of heat to the glass 2.

The mechanical connection of the propellant air fan 7 and of the component of the propellant air fan 7, which circumscribes the mixing section 9 with the guiding means 6, has been omitted in FIGS. 1 to 3 for reasons of simplification. The guiding means 6, for example, has the corresponding lines and valves, filters and the like which are not shown, in order to supply the fan air from the fan 5 to the propellant air fans 7 via nozzles 10. Preferably, the nozzles 10 are mounted on nozzle beams 13 which in particular also hold the propellant air fans 7 via connecting means. In particular the nozzle 10 itself is also used as the fastening. Reference should be made to the following discussion of FIG. 4.

The system 1, furthermore, has a conveyor means 14 for conveyance of the glass 2. In particular the conveyor means 14 comprises rollers 15, especially of ceramic, for support and conveyance of the glass 2, as is indicated in FIG. 1.

Preferably, the glass 2 in the system 1 is moved in an oscillating manner, back and forth, as indicated by the arrow in FIG. 1. This prevents hot glass 2 from being deformed between the rollers 15 during treatment.

The propellant air fans 7 are shown preferably in rows transverse to the conveyor direction F. Each row is held by an assigned nozzle beam 13 of the guiding means 6 and is supplied with fan air. The rows of propellant air fans 7 and the nozzle beams 13 of the guiding means 6 run preferably transverse to the conveyor direction F of the glass 2 (and/or horizontally).

The heating means 4 are made preferably as resistance heaters, as radiant heaters or as gas burners. Moreover, the heating means 4 extend preferably at least essentially parallel to the nozzle beams 13 and are preferably arranged offset to them or even between them.

Preferably, the system 1 is made such that several or all air swirls 8 brush or flow around at least one heating means 4 at a time. In this way, especially effective heating of the chamber air flowing through the propellant air fans 7 is induced. The air swirls 8 are shown schematically in FIGS. 1 and 2. In particular, several air swirls 8 on top of one another, for example, essentially circular in cross section, or swirl rolls can also be formed.

In the system 1 of the present invention, the fan air is not preheated necessary because of the low fan air flows. Even if preheating were possible, blowing in fan air without preheating has a major advantage with respect to the delivery of chamber air. As has already been explained above, cold air the mass flow is distinctly higher than for preheated fan air, and as a result improved acceleration is provided in the propellant air fans 7.

Key formation at the start of the heat-up process for plate glass was previously discussed. In the present invention an operating mode of the system 1 is recommended in which, while the glass 2 is still cold in the heating chamber 3, a large amount of fan air is supplied quickly to the propellant air fans 7. This immediately yields intensive heat convection and heat transfer to the glass 2 so that the key formation can be avoided. This applies especially in E-glass with a top coating which makes it difficult to heat up the glass by thermal radiation. During this first heat-up phase of the glass 2, an average volumetric flow of fan air is sufficient. In the end phase of heating of the glass 2, only little or no fan air should be supplied. The glass 2 is now so soft that the dirt particles entrained by the air swirls could adhere to the surface of the glass which would result in Optical faults. Thus, in this end phase of heating of the glass 2, swirl formation is better omitted. Therefore key formation is not a problem either because the radiation portion at this high glass temperature has become very good, therefore temperature equalization takes place in the glass 2 itself.

The system 1 and process of the present invention, compared to the prior art, lead to a more uniform air temperature over the glass surface, to a more uniform velocity of the air flow over the glass surface, to lower cooling of the chamber air (furnace atmosphere) and to an average air velocity which is higher by roughly 80% on the glass, and thus to better convection.

Figure 4:
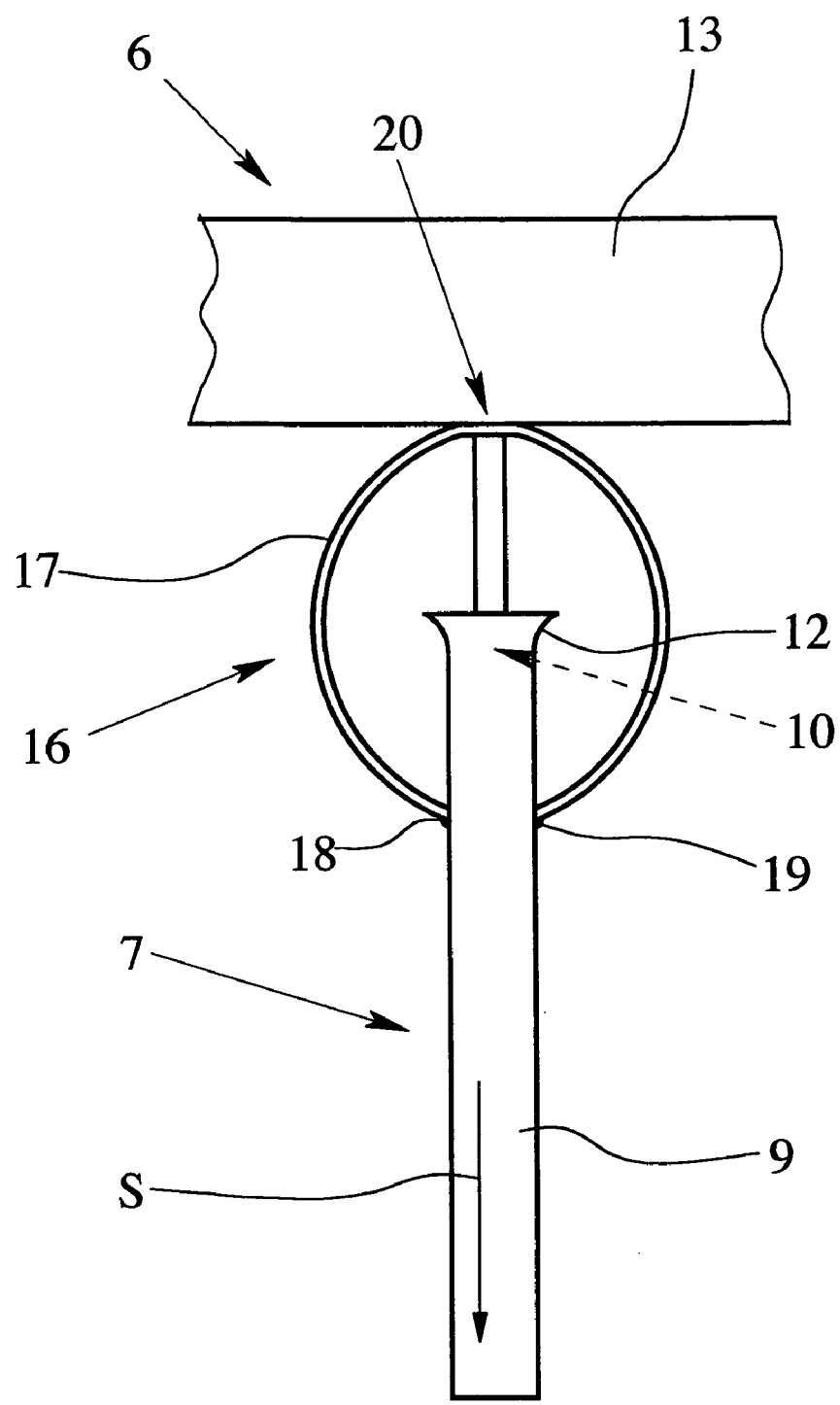
FIG. 4 shows a schematic view of a propellant air fan of the system in another embodiment.

Finally, reference should be made to a preferred configuration of the attachment of the propellant air fan 7 to the guiding means 6 as for the rest, shown in FIG. 4. "Guiding means 6 as for the rest" in this case means especially the nozzle beam 13.

In a preferred configuration, the nozzle 10 is connected to the guiding means 6 via a clamping connection (preferably via a screw connection). This has advantages not only for production engineering, but leads to an especially simple mechanical connection 16 between the propellant air fan 7 and the guiding means 6 as for the rest, as is described below.

First of all, it is important that this mechanical connection 16 is made preferably such that when the temperature fluctuates and with the resulting material expansions, the centering of the nozzle 10 in the assigned mixing section 9 remains unaffected. A restriction of this centering would lead specifically to unwanted turbulence in the area which lies between the nozzle 10 and the mixing section 9.

The aforementioned need for the mechanical connection 16 is satisfied by the embodiment shown in FIG. 4. The mechanical connection 16 is made as an annular section 17 with two annular section ends 18, 19. The two annular section ends 18, 19 are connected to the propellant air fan 7. For this connection, there is preferably a weld connection, but alternatives are also conceivable. The guiding means 6, as for the rest (the nozzle beam 13 here), is connected between the two annular section ends 18, 19 to the annular section 17. Here, is it preferably a clamping joint.

FIG. 4 shows that, among others, by the symmetrical structure of the mechanical connection 16, temperature-induced material expansion can lead in any case to a displacement of the nozzle 10 in FIG. 8 up or down.

Furthermore, the mechanical connection 16 is shaped such that unwanted influence on the flow is hardly perceptible. The annular section 17 is made as narrow as possible here. In a preferred configuration the annular section 17 has a width of, for example, 10 mm.

The connection of the annular section 17, and thus of the propellant air fan 7, to the guiding means 6 as for the rest, here therefore to the nozzle beam 13, is of special interest. The annular section 17 is specifically attached by clamping by means of a screw connection between the nozzle 10 and the guiding means 6. For this purpose, the annular section 17 has a hole 20 through which in any case one component of the nozzle 10, here therefore the thread of the nozzle 10, can be routed. This leads in turn to especially economical production and a compact structure.

What is claimed is:

1. A system for heat treatment of glass, comprising:
    a heating chamber;
    at least one heating means for radiant heating within the heating chamber;
    a compressor located outside of the heating chamber; and
    a guiding means for supplying compressed gas from the compressor to the heating chamber,
    wherein the guiding means comprises a plurality of air flow amplifiers positioned within the heating chamber for producing gas swirls in the heating chamber, in order to additionally heat the glass by intensified convection, wherein at least one gas swirl brushes against or flows around at least one heating means,
    wherein each air flow amplifier includes a tubular component with an open inlet side and an open outlet side that defines a mixing section with a constant clear diameter or cross section for conveying gas by in-flowing compressed gas and for mixing chamber gas and compressed gas, wherein the compressed gas is supplied to each air flow amplifier in a through-flow and central direction by a nozzle associated with each air flow amplifier on the inlet side thereof, and
    wherein the air flow amplifiers or their mixing sections are oriented at least substantially vertically.

2. The system as claimed in claim 1, wherein the entire volumetric flow of gas flowing out of each air flow amplifier, measured at an ambient temperature in the system, is greater by a volumetric factor of at least 30 than the volumetric flow of the gas which is supplied to the air flow amplifier.

3. The system as claimed in claim 1, wherein the air flow amplifiers or the mixing sections thereof have a ratio of length (L) to clear diameter (D) of at least 4.

4. The system as claimed in claim 1, wherein the air flow amplifiers or the mixing sections thereof have a length (L) of at least 15 cm.

5. The system as claimed in claim 1, wherein the air flow amplifiers or the mixing sections thereof have a clear diameter (D) of at least 10 mm.

6. The system as claimed in claim 1, wherein the volumetric flow of supplied gas air flow amplifier, measured at an ambient temperature in the system, is at most 2 $m^3/h$.

7. The system as claimed in claim 1, wherein the total volumetric flow of gas flowing from each air flow amplifier is at least 20 $m^3/h$.

8. The system as claimed in claim 1, wherein the nozzle is located concentrically within the mixing section of the air flow amplifier and projects into it.

9. The system as claimed in claim 1, wherein the nozzle has an opening with a diameter (DD) of at most 2 mm.

10. The system as claimed in claim 1, wherein the nozzle has an opening with a length (DL) of 1 to 12 mm.

11. The system as claimed in claim 1, wherein the nozzle has an opening with a diameter (DD) of at most 2 mm, wherein the nozzle has an opening with a length (DL) from 1 to 12 mm and wherein the ratio DL/DD is between 3 and 5.

12. The system as claimed in claim 1, wherein the air flow amplifiers further include a confliser, the confuser having a ratio of an inlet diameter to an outlet diameter of less than 1.5 or a length which is at most 5% of the length L of the mixing section, located downstream.

13. The system as claimed in claim 12, wherein the nozzle is located centrally in the associated mixing section and projects into it, and wherein the exit opening of the nozzle, measured at the ambient temperature in the system, is at the height of the transition from the mixing section to the confuser.

14. The system as claimed in claim 1, wherein the air flow amplifiers do not include diffusers.

15. The system as claimed in claim 1, wherein the air flow amplifiers are located at a distance of 5 to 15 cm from the glass.

16. The system as claimed in claim 1, wherein the air flow amplifiers are arranged in rows on nozzle beams of the guiding means which run transversely to a conveying direction of the glass.

17. The system as claimed in claim 1, wherein the heating means extend parallel to nozzle beams of the guiding means which bear the air flow amplifiers.

18. The system as claimed in claim 1, wherein the heating means are located above the air flow amplifiers and laterally offset to or between them.

19. The system as claimed in claim 1, wherein the nozzle is connected to the guiding means via a screw connection.

20. The system as claimed in claim 1, wherein a mechanical connection is provided between the air flow amplifier and the guiding means, and wherein the mechanical connection is adapted to maintain centering of the nozzle in the respective mixing section despite temperature fluctuations and resulting material expansions and contractions.

21. The system as claimed in claim 20, wherein the mechanical connection between the air flow amplifier and the guiding means has an annular section with two annular section ends, wherein the two annular section ends are connected to the air flow amplifier and wherein the guiding means is connected to the annular section between the ends thereof.

22. The system as claimed in claim 21, wherein the nozzle is connected to the guiding means via a screw connection, and wherein the annular section has a hole through which a component of the nozzle can be routed for connecting the guiding means and the annular section.

23. The system as claimed in claim 1, wherein, in operation, unheated gas is supplied to the air flow amplifier.

24. The system as claimed in claim 1, wherein the heating means is one of a resistance heater, a radiant heater or a gas burner.

25. The system as claimed in claim 1, wherein the system further comprises a conveyor means for delivering the glass.

26. The system as claimed in claim 25, wherein the conveyor means has several rollers for carrying the glass.

* * * * *